US011893713B1

(12) United States Patent
Zhang et al.

(10) Patent No.: US 11,893,713 B1
(45) Date of Patent: Feb. 6, 2024

(54) AUGMENTED DIFFUSION INVERSION USING LATENT TRAJECTORY OPTIMIZATION

(71) Applicant: INTUIT INC., Mountain View, CA (US)

(72) Inventors: Jiaxin Zhang, Mountain View, CA (US); Kamalika Das, Saratoga, CA (US); Sricharan Kallur Palli Kumar, Fremont, CA (US)

(73) Assignee: INTUIT, INC., Mountain View, CA (US)

( * ) Notice: Subject to any disclaimer, the term of this patent is extended or adjusted under 35 U.S.C. 154(b) by 0 days.

(21) Appl. No.: 18/309,514

(22) Filed: Apr. 28, 2023

(51) Int. Cl.
*G06T 5/00* (2006.01)
*G06T 9/00* (2006.01)

(52) U.S. Cl.
CPC ............ *G06T 5/002* (2013.01); *G06T 9/00* (2013.01); *G06T 2207/20076* (2013.01)

(58) Field of Classification Search
CPC . G06T 5/002; G06T 9/00; G06T 2207/20076; G06T 5/50; G06T 3/4053; G06T 2207/20016; G06T 3/4046; G06T 9/002; G06T 2207/20081; G06T 2207/20084; G06V 10/30; G06V 10/751; G06V 30/164; G06V 10/454; G06V 10/54; G06V 10/774; G06V 10/82; G06V 30/18057; G06K 9/40; G06K 7/1482; G06N 3/02; G06N 3/08-088; G06N 3/0445; G06N 3/0454; G06N 3/4046; G06N 7/00; G06N 20/00; Y10S 128/925
See application file for complete search history.

(56) References Cited

U.S. PATENT DOCUMENTS

| | | | | |
|---|---|---|---|---|
| 2018/0286023 A1* | 10/2018 | Zhu | ........................ | G06T 5/005 |
| 2019/0251721 A1* | 8/2019 | Hua | ........................ | G06T 5/002 |
| 2020/0242771 A1* | 7/2020 | Park | ...................... | G06T 11/001 |
| 2020/0242774 A1* | 7/2020 | Park | ........................ | G06N 3/045 |
| 2021/0097691 A1* | 4/2021 | Liu | ........................ | G06V 10/764 |
| 2022/0101104 A1* | 3/2022 | Chai | ........................ | G06N 3/08 |
| 2022/0392025 A1* | 12/2022 | Mironica | ................... | G06T 7/11 |
| 2023/0042221 A1* | 2/2023 | Xu | ........................ | G06F 9/453 |
| 2023/0081171 A1* | 3/2023 | Zhang | ................... | G06F 18/2148 |
| | | | | 382/157 |
| 2023/0126177 A1* | 4/2023 | Xu | ........................ | G06T 5/50 |
| | | | | 382/275 |

* cited by examiner

*Primary Examiner* — Jose L Couso
(74) *Attorney, Agent, or Firm* — Patterson + Sheridan, LLP

(57) ABSTRACT

Augmented Denoising Diffusion Implicit Models ("DDIMs") using a latent trajectory optimization process can be used for image generation and manipulation using text input and one or more source images to create an output image. Noise bias and textual bias inherent in the model representing the image and text input is corrected by correcting trajectories previously determined by the model at each step of a diffusion inversion process by iterating multiple starts the trajectories to find determine augmented trajectories that minimizes loss at each step. The trajectories can be used to determine an augmented noise vector, enabling use of an augmented DDIM and resulting in more accurate, stable, and responsive text-based image manipulation.

20 Claims, 5 Drawing Sheets

AUGMENTED DIFFUSION INVERSION USING LATENT TRAJECTORY OPTIMIZATION

INTRODUCTION

Aspects of the present disclosure relate to digital image manipulation. Textual input can be used to manipulate digital images. Inversion and construction of images in the presence of textual conditioning may be performed in various contexts. Augmented Denoising Diffusion Implicit Models ("DDIMs") using latent trajectory optimization, in certain embodiments, enable accurate and stable inversion and construction of output images from input images and text.

BACKGROUND

Contemporary digital image manipulation applies many different techniques to achieve results in various contexts, allowing users to create or edit images. One such technique is image creation with generative models. Text-guided image editing in particular is a rapidly growing field in which new techniques are still being discovered. Image generation and editing using text is increasingly popular because it is fast, simple and intuitive to use. However, existing techniques for text-based image generation and editing have several drawbacks. For example, current generative models can perform some partial image synthesis using text-guided input, but regularly suffer from distortion and instability.

Inversion is an important step in the text-guided image editing process. Inversion refers to a reversed generation process. That is, if a generated image is generated based on a prompt and other elements, an inversion refers to determining the other elements, such as a recreated image or noise associated with the image, given the generated image and the prompt. During a generative process, inversion is performed to select elements used for generation. However, the inversion processes often cause inaccuracy, especially with text or other perturbations, and high resource usage. Particularly difficult is the problem of determining a noise for inversion processes of text-guided diffusion in an accurate manner in an open ended, classifier-free guidance context.

Existing techniques for inversion lead to results that are often unstable, distorted, or inaccurate, causing attempted image manipulation to fail. Thus, there exists a need in the art of text-guided image generation and editing for an inversion process that is stable, accurate, robust, and that provides responsive, undistorted, accurate, and high-quality output, with low resource usage.

BRIEF SUMMARY

The present disclosure relates to a method for augmented diffusion inversion using latent trajectory optimization. According to various embodiments, the method comprises a method of automated image generation including one or more steps of: receiving an image; generating a diffusion model of the image; generating a noise vector for the diffusion model by deterministically applying noise to the image; encoding the image with a bias correction variable by replacing an empty textual embedding of the diffusion model with a conditional textual embedding to generate an augmented diffusion model; generating an augmented noise vector using the noise vector, the augmented diffusion model, and a latent trajectory optimization process to determine one or more diffusion trajectories for the augmented noise vector; and automatically generating an output image based on the augmented noise vector.

Other embodiments provide processing systems configured to perform the aforementioned methods as well as those described herein; non-transitory, computer-readable media comprising instructions, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
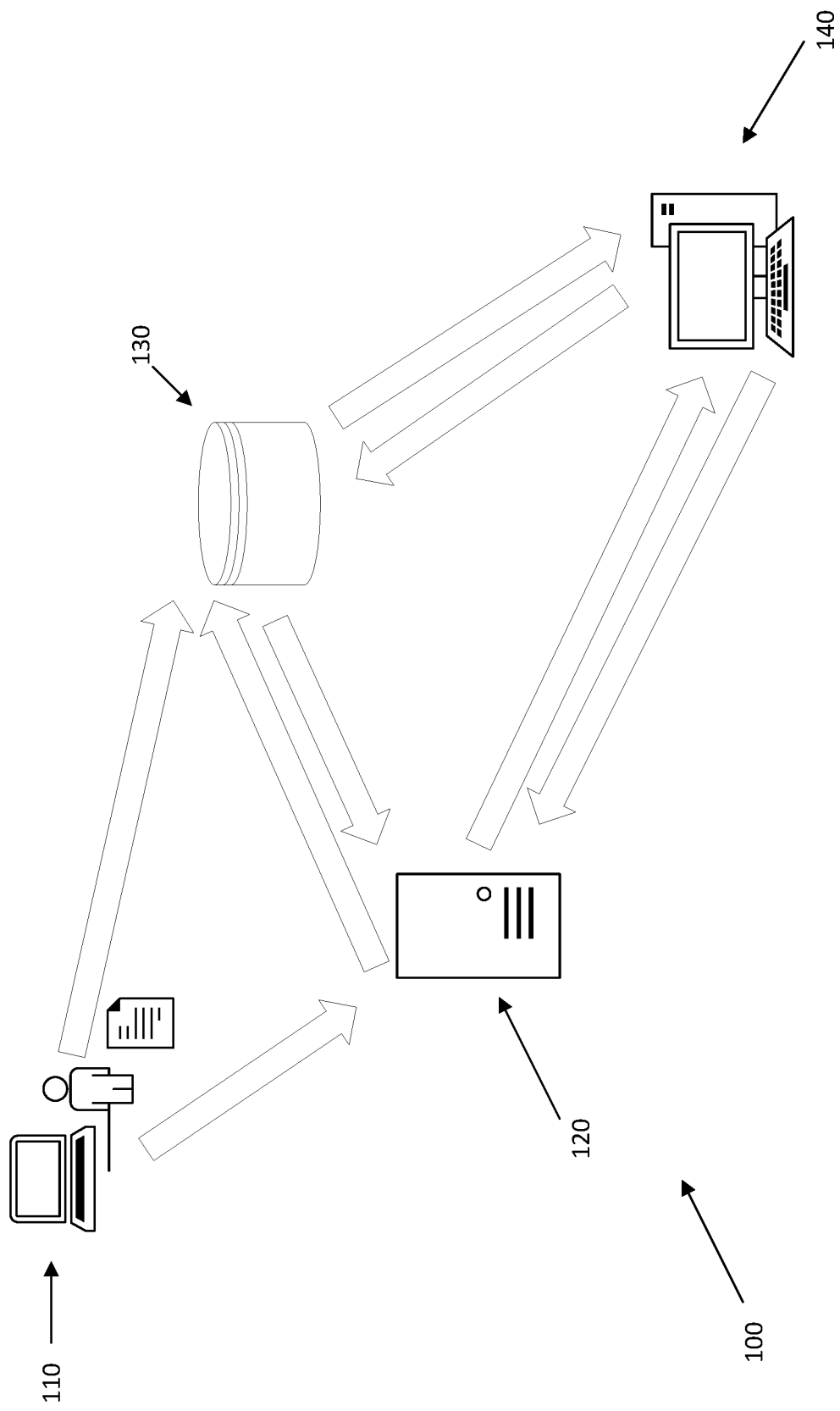
FIG. 1 is a system of computing devices using diffusion inversion, according to embodiments.

Aspects of the present disclosure relate to using augmented noise vectors for inversion of images and/or to using latent trajectory optimization to determine a bias factor for performing an augmented diffusion inversion process. Various embodiments perform image reconstruction, generation, or editing using the augmented noise vectors and conditioned on a text prompt, which may be input in natural language by a user. Embodiments disclosed herein overcome existing barriers associated with diffusion inversion given classifier-free guidance in real image editing.

By defining the information loss occurring from the classifier-free guidance and accumulated error from textual perturbation during inversion of a diffusion model including a text prompt, learnable latent variables can be encoded having intrinsic information between input images and noise vectors. To this end, an augmented formulation can be built to convert the original inversion to an augmented bijective inversion. In contrast to traditional inversion techniques, techniques disclosed herein optimize the newly introduced latent variables to fully invert the input image and text prompt. As opposed to a traditional DDIM, the augmented DDIM is augmented using noise bias correction of latent noise variables in the uploaded files and by using textual bias correction of latent variables relating to textual input.

A latent trajectory optimization process ("latent-TOP") is used for optimizing the noise trajectory at each step of a linear regressive solution of the model representation, so that an augmented noise vector can be determined that accurately reproduces an input image when used with the augmented diffusion construction process, enabling more accurate image manipulation, creation, or recreation.

Thus, embodiments disclosed herein provide methods for text-guided manipulation and editing of real images, which exhibit high-fidelity with a high ability of text-guided manipulation and with structural preservation. Such embodiments include optimizing a sequence of noised latent encodings of diffusion trajectories, i.e., picking an optimal diffusion trajectory for each vector. A local optimization using prior information is performed as an enhanced starting point. A fast local search around the prior trajectory rather than a global search starting from a random initialization may be performed. Multiple initializations of the learnable latent variables are sampled. A solution with a lowest initial loss is chosen. This latent trajectory optimization process ("latent-TOP") can be iterated as necessary at each step of the sequence of diffusion trajectory encodings to reduce noise at the step.

Processes described herein allow increased editability without the increased distortion that would occur with traditional methods. For example, classifier-free guidance with a large scale is often utilized for non-trivial semantic edits to real images, but the large guidance scale amplifies the accumulated errors that traditional noise vectors accumulate, possibly causing the noise distribution to violate the assumption of a Gaussian distribution and causing a failed generation result. The augmented DDIMs using latent-TOP as described herein can achieve accurate results in part by mitigating such accumulated noise, thereby overcoming deficiencies of existing techniques.

FIG. 1 is a system of computing devices using diffusion inversion, according to embodiments. In the example system 100 of FIG. 1, a user may use a client device 110 to upload one or more files, such as an image or document, to a server device 120 or to a data store 130.

Data may also be transferred between the server 120 and the data store 130, e.g., for storage and/or retrieval.

The server device 120 and/or the data store 130 can be accessed by a computing device 140. Text can be input into the computing device 140. The computing device 140 can transmit the text to the server device 120 or to the data store 130 to manipulate, edit, or retrieve files uploaded by a client device 110. It is anticipated that there will be a plurality, if not many, client devices, uploaded files, servers, data stores, and/or computing devices 140 in various embodiments. In some embodiments the client device 110 is one of the computing devices 140.

In various embodiments, the input text may be in the form of natural language. A natural language processing module can process an input text prompt using various techniques known in the art, such as using natural language processing (NLP) techniques.

In example embodiments, a user may upload an image. Natural language can be used to determine a type of action or type of image manipulation to be performed. The type of image manipulation (or creation) can be various types of actions. Different types of processes and/or actions, and resulting output images can include, by way of non-limiting example: image recreation where the output image is a reconstruction of the initial source image; image recreation where the output image is a reconstruction of the initial source image conditioned on a text prompt to add or change an element (i.e. change the background color; change the style; remove an element; fix a stained, smudged or water-damaged part of a document, change a hairstyle, etc.); new image generation conditioned on a text prompt without an initial image; creation of a custom document or image based on text-based (natural language) instructions, etc.. Each of these and other applications may use methods of augmented DDIM and/or latent-TOP for generating the output image.

Diffusion inversion can be performed on an image or document, and the results of the inversion, for example a resulting noise vector, can be used in an image generation process to create an output image. Generating inversions for images using diffusion inversion allows for advanced searching, matching, and extracting of data elements for image generation or editing.

In embodiments, the server device 120 may perform an augmented DDIM inversion process and/or a latent-TOP process on uploaded data for generating an output image. The server device 120 may access the data storage 130 to access a library of data. The library of data may include an image and/or text library. For example, an image repository of tagged images can be used for conditioning output based on textual input matching a tag of the image.

In some embodiments, the server device 120 includes a cloud service and the data storage 130 includes user account information. Textual input can be used to generate custom documents based on the user account information. For example, the user account information can include multiple type of images, documents, or other uploads. Natural language input can be used to generate a custom file by identifying a desired selection of uploaded images, documents, or other uploads. For example, a user account may have previous years of tax return data. The natural language input can be used to extract portions of the data and arrange them in a custom document or report. The natural language may also be used to clean documents, such as by removing blemishes from the document or censoring portions identified by the natural language. In various embodiments, optical character recognition ("OCR") can be performed to identify language in an image or document matching the natural language input or related terms.

It is noted that computing devices described herein, such as client device 110, server device 120, and/or computing device 140 may comprise one or more memory devices, one or more processing devices, one or more network communication interfaces (e.g., network interface controllers), and/or the like. For example, a computing device may comprise a memory that stores instructions and one or more processors that are configured to execute the instructions stored in the memory in order to perform one or more methods described herein.

Figure 2B:
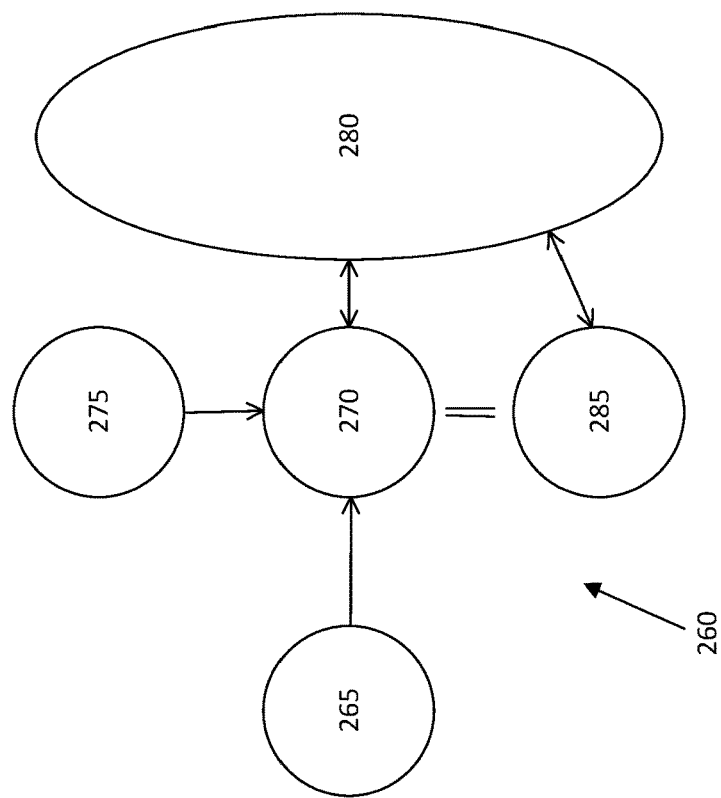
FIG. 2B is a diagram demonstrating an augmented DDIM inversion process, according to embodiments.
Figure 2A:
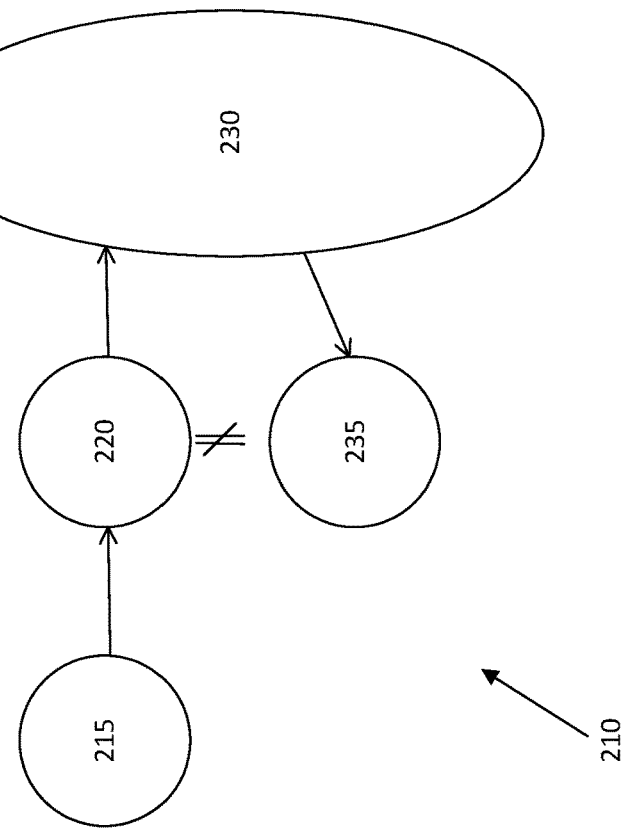
FIG. 2A is a diagram demonstrating a Denoising Diffusion Implicit Model ("DDIM") inversion process, according to embodiments.

FIGS. 2A-B are diagrams demonstrating Denoising Diffusion Implicit Model (DDIM) inversion and/or reconstruction methods, according to embodiments. FIG. 2A is a diagram demonstrating a DDIM inversion and reconstruction method 210, and FIG. 2B is a diagram demonstrating augmented DDIM inversion and reconstruction method 260, according to embodiments.

Various diffusion models are based on the presumption that forward diffusion generates a Markov chain (a sequence of events in which the probability of each event depends on the previous event). A forward diffusion process performs a progressing procedure from $x_0$ to $x_T$ via a Markov chain, with T variables $x_1, \ldots, x_T$ by gradually adding noise to the data via Gaussian transition. When T is large enough, the last noise vector $x_T$ nearly follows an isotropic Gaussian distribution. The forward process has a simple closed-form solution that expresses the latent variable $x_t$, $t \in \{0, \ldots, T\}$ as a linear combination of noise and $x_0$ such as:

$$x_t = \sqrt{\alpha_t} x_0 \sqrt{1-\alpha_t} \epsilon_t, \epsilon_t \sim \mathcal{N}(0, I), \quad (1)$$

where $\alpha_t$ is referred to as the noising schedule which defines the amount of noise present at each intermediate timestep, $0 = \alpha_T < \alpha_{T-1} < \ldots < \alpha_1 < \alpha_0 = 1$. Each refinement step consists of an application of a neural network $f_\theta(x, t)$ on a current sample $x_t$, followed by a random Gaussian noise perturbation, obtaining $x_{t-1}$. The network is trained for a denoising objective, aiming for $f_\theta(x_t, t) = \epsilon_\theta^{(t)}(x_t) \approx \epsilon_t$.

Sampling from distribution $q(x_0)$ is defined by a reverse process, from isotropic Gaussian noise $x_T$ to data, which is refined iteratively through $t \leq T$ passes through the neural network. These or other sampling strategies can be used to define the process of merging the noise prediction and current image $x_t$ to produce the previous image $x_{t-1}$ to result in $x_0$ as a final generated image.

Although various models are iteratively defined in this way, unlike Diffusion Denoising Probabilistic Models (DDPM), Denoising Diffusion Implicit Models (DDIMs) specifically use a non-Markovian generative sampling process for inversion. The process assumes that an ordinary differential equation (ODE) representation of the generative process can be reversed in steps. Thus, an ODE representation of the image is generated. The image is inverted in a stepwise manner by deterministically noising the initial image to determine an initial noise vector.

The ODE representation of the image provided by the DDIM is solvable in steps (up to a discretization error) using an Euler method over the representation. Increasing the steps can reduce the discretization error. The result of the Euler method solution is a noise vector and series of trajectories and timestamps corresponding to each step of the Euler method. In certain cases, the resulting noise vector follows a Gaussian assumption of normality. However, in cases where the noise vector is non-Gaussian, instability and/or distortion can result when using traditional diffusion models and methods.

In FIG. 2A, the DDIM inversion and reconstruction method 210 includes a text prompt 215 and an initial image 220. The text prompt 215 and initial image 220 can be uploaded or input into a computing system performing the method by one or more users. The initial image is conditioned by the text prompt 215 to generate an initial noise trajectory 225. The initial noise trajectory 225 can be used in an image generation process to generate an output image 230. In various embodiments, the output image 230 could be an attempted recreation of the initial image through the inversion and generation process, an edited version of the initial image, or a newly generated image, etc. However, for stable and consistent editing and new image generation, it may be beneficial to first enable close generative reconstruction of the image.

DDIM uses a generate sampling process defined according to the non-Markovian formulation:

$$x_{t-1} = \sqrt{\frac{\alpha_{t-1}}{\alpha_t}} x_t + \left( \sqrt{\frac{1-\alpha_{t-1}}{\alpha_{t-1}}} - \sqrt{\frac{1-\alpha_t}{\alpha_t}} \right) \epsilon_\theta^{(t)}(x_t) \quad (2)$$

This formulation (2) is invertible according to the following formulation:

$$x_{t+1} = \sqrt{\frac{\alpha_{t+1}}{\alpha_t}} x_t + \left( \sqrt{\frac{1-\alpha_{t+1}}{\alpha_{t+1}}} - \sqrt{\frac{1-\alpha_t}{\alpha_t}} \right) \epsilon_\theta^{(t)}(x_t) \quad (3)$$

The inversion can be understood as a diffusion process performed in the reverse direction, whereby the process involves deterministically noising an image to obtain the initial noise vector. The error of DDIM inversion is reasonably small since (3) can be treated as an Euler method over the following ODE, thus error is limited by the bound of the discretization errors of the ODE solver:

$$d\hat{x}(t) = \epsilon_\theta^{(t)}\left( \frac{\hat{x}(t)}{\sqrt{\sigma^2+1}} \right) d\sigma(t) \quad (4)$$

where $\hat{x} = x/\sqrt{\alpha}$ and $\sigma = \sqrt{1-\alpha}/\sqrt{\alpha}$. However, in practice, a slight error is incorporated in every step, and eventually, the accumulated error might be non-negligible and could cause instability. In some cases, increasing the number of steps can reduce error. However, in some cases, the error can accumulate and the obtained noise vector might be out of the Gaussian assumption, leading to distortion and/or instability in results. Methods described herein facilitate generating an augmented noise vector which can be used in situations where a traditional noise vector would instead violate the Gaussian assumption and lead to failed or poorly generated results.

In embodiments, text-guided diffusion models can be used to generate an output image given conditioning textual prompt P and an initial image. The textual prompt P and can be used to direct editing of the initial image using natural language. Even without a text prompt component, traditional DDIM inversion models result in a noise vector that is accurate only up to a discretization error. Such error is further compounded, and new bias introduced, by further complicating the generative model by using a textual input as part of the generative process. The augmented models described herein can achieve success due to minimization of the distortion caused by both the discretization error and caused by introduction of a text prompt conditioning the result.

A further critical challenge is tuning the effect induced by the textual prompt such that a desired generating or editing effect occurs based on the natural language. To this end, a classifier-free guidance prediction model is used:

$$\tilde{\epsilon}_\theta^{(t)} = \epsilon_\theta^{(t)}(x_t, C_\emptyset) + \mathcal{G}(\epsilon_\theta^{(t)}(x_t, C_P) - \epsilon_\theta^{(t)}(x_t, C_\emptyset)) \quad (5)$$

where $C_P = \Psi(P)$ is the conditional textual embedding, $C_\emptyset = \Psi(\cdot)$ is the empty embedding, which is referred to as the unconditional textual guidance, and is the guidance scale, which adjusts the balance between conditional prediction $\tilde{\epsilon}_\theta^{(t)}(x_t, C_P)$ and unconditional prediction $\tilde{\epsilon}_\theta^{(t)}(x_t, C_\emptyset)$. Thus the unconditional DDIM in (2) can be extended to the conditional formulation:

$$x_{t-1} = \xi_t \cdot x_t + \phi_t \cdot \tilde{\epsilon}_\theta^{(t)}(x_t, C_P, C_\emptyset) \quad (6)$$

Where $\xi_t = \sqrt{\alpha_{t-1}/\alpha_t}$ and $\phi_t = \sqrt{(1-\alpha_{t-1})/\alpha_{t-1}} - \sqrt{(1-\alpha_t)/\alpha_t}$. This denoising process is approximately invertible with condition DDIM inversion performed by:

$$x_t = \frac{x_{t-1}}{\xi_t} - \frac{\phi_t}{\xi_t} \cdot \tilde{\epsilon}_\theta^{(t)}(x_t) \approx \frac{x_{t-1}}{\xi_t} - \frac{\phi_t}{\xi_t} \cdot \tilde{\epsilon}_\theta^{(t)}(x_{t-1}) \quad (7)$$

where $x_t$ is approximately reversible from $x_{t-1}$. The approximation in (7) uses the linearization assumption $\tilde{\epsilon}_\theta^{(t)}(x_t) \approx \tilde{\epsilon}_\theta^{(t)}(x_{t-1})$, which corresponds to reversing the first-order ODE solver. Although higher-order ODE solvers can stabilize the generative and reverse processes, DDIM inversion with these ODE solvers still relies on the strength of the linearization assumption. This assumption usually works for the unconditional DDIM models, but it often fails in conditional DDIM inversion since the classifier-free guidance is not consistent across time steps where the classifier free guidance is equal to the product:

$$G \cdot (\tilde{\epsilon}_\theta^{(t)}(x_t, C_P) - \tilde{\epsilon}_\theta^{(t)}(x_t, C_\emptyset)).$$

In various embodiments, a guidance scale affects how much conditioning occurs as a result of the text prompt. Traditional DDIM solutions encounter inconsistency and instability due to the effects of the compounding noise. Often, sufficiently high guidance for text-guided image edited to be effectual results in erratic and unstable diffusion, such as distortions in resulting images. With varying guidance scales, e.g., from 0.5 to 7.5, a trade-off between significant distortions and possible manipulations can occur.

Lowering the guidance scale G, e.g., from 7.5 to 1.0, can result in stabilization and better reconstruction accuracy, but it damages the strength of conditional editing by the text prompt. Traditional DDIM inversion is unstable in many cases with high guidance (e.g. greater than or equal to one). Specifically encoding from $x_0$ to $x_T$ and back often results in inexact reconstructions of the input images. This is especially true in the case of a very high guidance, since such a guidance scale amplifies the accumulated error.

FIG. 2B is a diagram demonstrating an augmented DDIM inversion process 260, according to embodiments. To address the inconsistency or loss of Gaussian assumption caused by accumulative errors induced by traditional DDIM inversion, the inversion process 260 is augmented by generating and applying new input factors into the model. The new arguments correct the biases of latent text embeddings and latent noise vectors. Thus an augmented formulation is introduced which is also a bijective and an invertible mapping:

$$x_T = \mathcal{F}_\theta(x_0, z; \mathcal{P}), x_0^* = \mathcal{F}_\theta^{-1}(x_T, z, \mathcal{P}) \quad (8)$$

where F is an encoder function of $x_0$ and z, and is parametrized by a DDIM model with parameters $\theta$, P is the textual prompt related to $C_P$ and $C_\emptyset$. Leveraging the benefits of latent variable z, augmented DDIM inversion becomes fully invertible and bijective. This enables exact reconstruct of an input image $x_0$ conditioning on text guidance P with the additional latent variable z via augmented DDIM inversion $x_T \to x_0^*$, which yields to $x_0^* = x_0$. In this way, an initial image can be fully inverted to generate and an output image generated using the augmented DDIM and the noise vector determined by the inversion. Introduction of the latent variable enables the output image to be an accurate reconstruction of the initial image. In some cases, the output image may be an element or selection of elements of the initial image (which may be used with other image elements to generate a new image), or an edited version of the initial image (which may be conditioned by the text prompt).

Information loss from introduction of a text prompt can result from the nature of the text prompt being input as classifier-free guidance into the model as well as partially caused by the accumulated error in each diffusion step. In situations where classifier-free guidance is used, the result is highly affected by an unconditional prediction. To optimize the model in the situation of classifier-free guidance, an empty textual embedding associated with the classifier-free text prompt can be replaced by a learnable text bias correction while keeping the conditional textual embedding unchanged, as follows:

Given the conditional textual embedding $C_P$ is unchanged, replace the default empty textual embedding $C_\emptyset$ by incorporating a textual bias correction $z_\emptyset$, i.e. $\tilde{c}_\emptyset = \mathcal{H}(C_\emptyset, z_\emptyset)$. Then, $\|x_0^* - x_0\| \le \|\epsilon\|$, where $\epsilon$ denotes a small error threshold and H represents a linear additive operator.

To address the complications arising from, for example, using a conditional textual prompt with a large guidance scale, a corrected, augmented noise vector is defined by $\tilde{x}_T = x_T + z_T$. In this formulation, $z_T$ is the learnable latent variable that is referred to as a noise bias correction. Combining the two bias corrections (the text bias correction and noise bias correction) together, such as by $z = (z_\emptyset, z_T)$, yields an augmented DDIM inversion model that can be then solved by latent trajectory optimization.

In FIG. 2B, a text prompt 265 and initial image 260 are used to generate an initial noise trajectory 280. However, the initial noise trajectory 230 of FIG. 2B is made by conditioning the initial image with a learned latent variable 275. The learned latent variable 275 is encoded or embedded into the noise trajectory 280. The noise trajectory 280 can be used to generate a reconstructed image 285. The reconstructed image 285 more closely matches the initial image 270 as compared to initial image 220 and reconstructed image 230. This is due to a corrective effect of the learned latent variable 275, which reduce the accumulated error caused by the stepwise diffusion inversion and reconstruction process.

Figure 3:
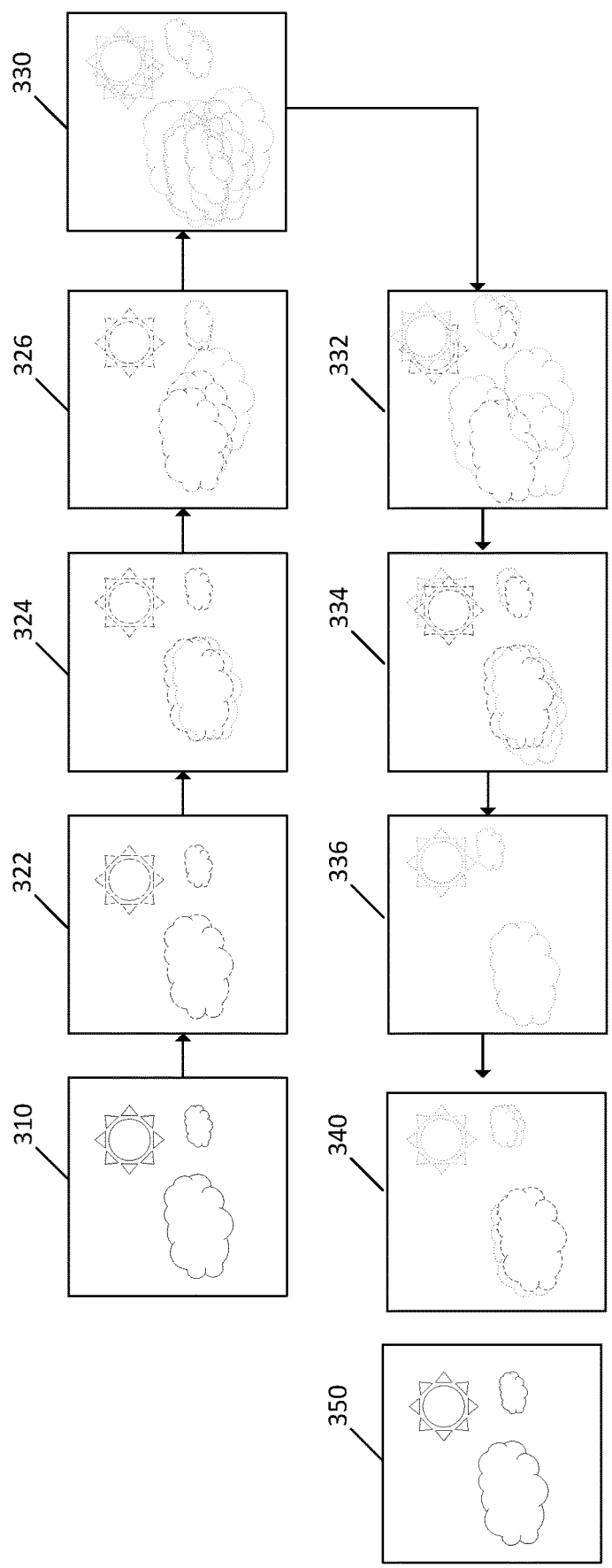
FIG. 3 is a diagram demonstrating a DDIM inversion and generation process, according to embodiments.

FIG. 3 is a diagram of a DDIM inversion and generation method, according to embodiments. In the example inversion and reconstruction method 300 of FIG. 3, a DDIM of the initial image 310 is used to generate a series of noised images 322, 324, 326, and a final noised image 330, which correspond to the stepwise solution generated by a first-order ODE solver. The final image 330 can be fully noised and can be represented as a noise vector $x_t^*$ (which may be referred to as the initial noise vector).

As shown, the method 300 includes a generative process that uses the initial noise vector 330 to generate a reconstructed image 340 via the linearization assumption $\tilde{\epsilon}_\theta^{(t)}(x_t) \approx \tilde{\epsilon}_\theta^{(t)}(x_{t-1})$. The DDIM includes an ODE representation of an image generative process which can be solved to obtain an inverse, or reverse process. The series of noised images are generated by an ODE solver which applies the stepwise Euler method solution to the ODE. These steps represent intermediate steps between the initial image and the fully noised image. Thus, the method 300 includes reconstructed noise vectors 332, 334, 336. In the example shown, the reconstructed image 340 is generated using an initial trajectory of the DDIM. However, the reconstructed image can be further optimized using an augmented DDIM formulation and a latent trajectory optimization of noise bias and textual bias factors to improve the stepwise inversion and reconstruction process of the naive DDIM model. Rather than using an assumption of linearity, the augmented DDIM uses improved trajectories that are more accurate than those obtained assuming linearity. This mitigates accumulation of errors occurring during the stepwise process due to non-linearity.

By replacing the trajectory of the noise vectors 332, 334, 336 with trajectories optimized at each step using latent trajectory optimization, an augmented noise vector can be generated which more closely matches the trajectory of the actual transition from the initial image to the initial noise vector at each step and associated timestamp. This enables a more accurate generation of the original image from the augmented noise vector during reconstruction, resulting in improved image output 350 which matches the input image 310. In this way, some or all of the inaccuracies of the naive DDIM trajectories at each step 332, 334, 336, is eliminated.

Although the example of FIG. 3 shows three intermediate vectors 332, 334, 336 corresponding to three steps of the Euler method solution, more or fewer steps can be used. For example, T=10 steps can be used in certain embodiments. At each step, a latent trajectory optimization ("latent-TOP") process can be iterated to obtain the corrective factors to be applied to the initial noise vectors to produce the augmented noise vectors. In various embodiments, the latent-TOP process is iterated 50 times at each of the 10 steps, although more or less steps or iterations may be desirable in various applications. The latent TOP process is described further below in regards to FIG. 4.

Figure 4:
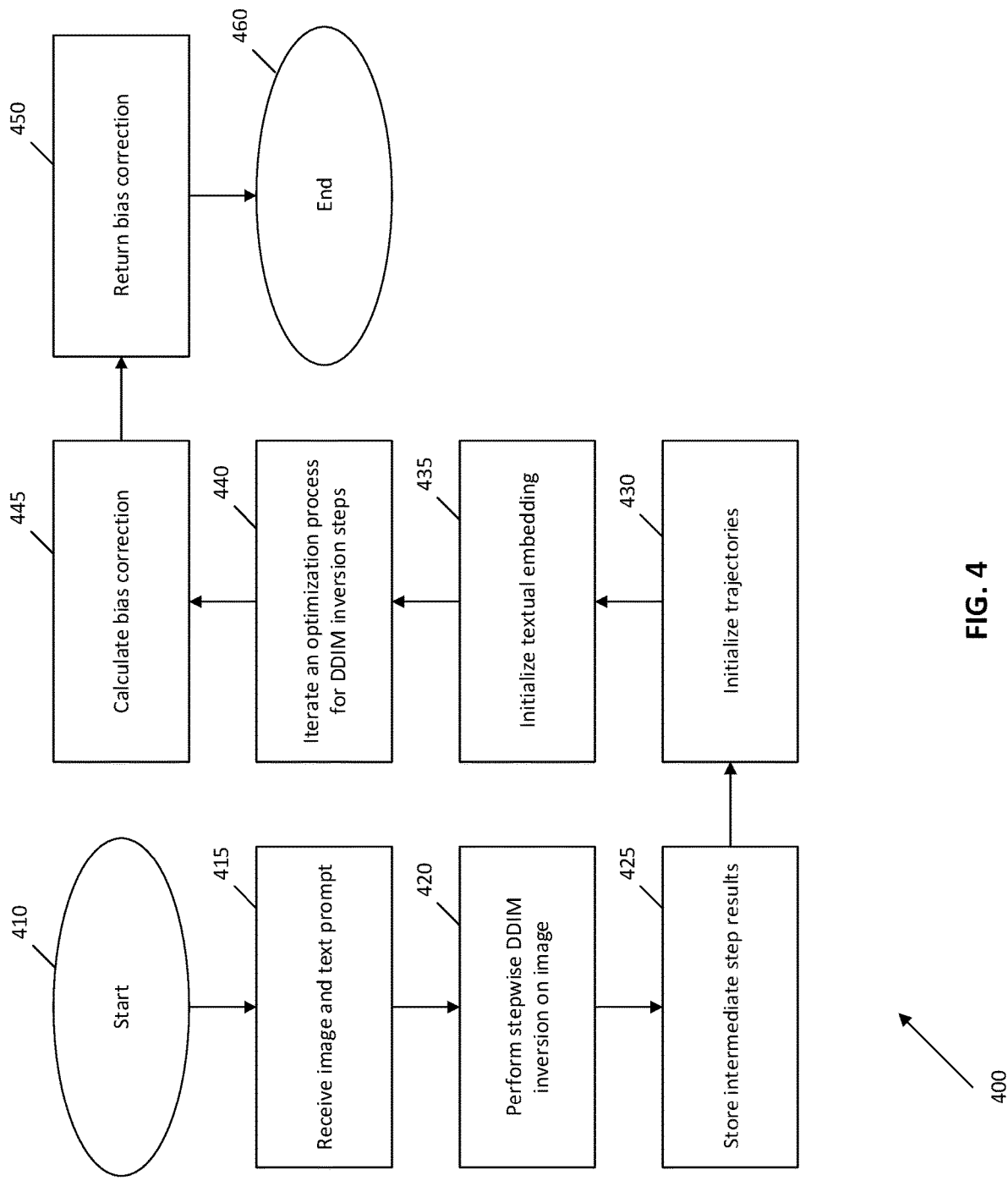
FIG. 4 flow chart demonstrating a latent trajectory optimization method, according to embodiments.

FIG. 4 is a flow chart demonstrating a method 400 of latent trajectory optimization, according to embodiments. In FIG. 4, the method 400 begins at starting block 410 and proceeds to stage 415 where an image and text prompt are received. For example, an image may be uploaded to a server or data storage device, and a user may input text into a user device in communication with the server or data storage device such that the text and image are received at a computing device performing the method.

From stage 415 where the image and text prompt are received, the method 400 may proceed to stage 420 where a stepwise DDIM inversion is performed on the image. For example, a DDIM inversion process having 50 steps can be performed to obtain 50 intermediate steps results. In various embodiments, greater or fewer steps can be performed in the DDIM process. In the example of FIG. 4, a guidance factor of one can be used for the stepwise DDIM inversion of stage 420, although a greater or lower guidance factor may also be used.

From stage 420 where the stepwise DDIM inversion is performed on the image, the method 400 may proceed to stage 425 where intermediate step results are stored. For example, a vector or trajectory value and a timestamp value corresponding to each step can be stored in memory or storage.

From stage 425 where intermediate step results are stored, the method 400 may proceed to stage 430 where trajectories are initialized. For example, respective trajectories of the intermediate step results can be used as initialization values for the latent trajectory optimization.

From stage 430 where trajectories are initialized, the method 400 may proceed to stage 435 where a textual embedding is initialized. For example, an unconditional textual embedding can replace the empty textual embedding as an initialization value of the text prompt for the latent trajectory optimization.

From stage 435 where the textual embedding is initialized, the method 400 may proceed to stage 440 where an optimization process is iterated for DDIM inversion steps. For example, a loss function may be iterated to determine local minima around the initial trajectories. In embodiments, a guidance factor greater than one (or a guidance factor greater than the guidance factor used in stage 430 where the trajectories were initialized) can be used. In various embodiments, the optimization is iterated ten times, or a lesser or greater number of times to determine a bias correction for each step.

A separate optimization with a guidance scale G>1 (or greater than the guidance factor used in stage 430) is used for each timestamp t=T, ..., 1, which follows the objective:

$$z_\phi^*, z_T^* = \mathrm{argmin} \|x_{t-1}^* - x_{t-1}(\bar{x}_t, z_\phi, z_T, C_\mathcal{P})\|_2^2 \qquad (9)$$

where $x_{t-1}$ ($\bar{x}_t$, $z_\phi$, $z_T$, $C_\mathcal{P}$) denotes the DDIM sampling step using $\bar{x}_t$, the textual bias correction $z_\phi$, noise bias correction $z_T$ and the conditional embedding $C_P$. In other words, the current noisy latent factor is then used in the optimization of the trajectory for the next step to minimize the distance between the newly determined trajectory and the trajectory yielding image $x_0$.

For each timestamp t, the optimization (9) can be executed for m iterations where the initial points of $z_\phi^0$, $z_T^0$ are selected using a multiple start strategy via sampling. In various examples, m is equal to ten iterations, although more or less iterations may be used. At the end of each step, upon the completion of the m iterations, the latent variable at that step is updated by $\bar{x}_{t-1} = x_{t-1}(\bar{x}_t, z_\phi, z_T, C_P)$. This results in a sequence of local values $z_\phi = z_\phi(t)$ for each timestamp t, and a global variable $z_T$ used for $x_T$. The optimization results in correction terms $z^* = (z_\phi^*, z_T^*)$, which is equivalent to the optimized unconditional empty embedding $\bar{C}_\phi$ and Gaussian noise vector $\bar{x}_T^*$, which can be used for real image editing.

From stage 440 where the optimization process is iterated for the DDIM inversion steps, the method 400 may proceed to stage 445 where bias correction is calculated. For example, the bias correction for each step of the stepwise inversion of stage 420 can be used to determine an overall improved trajectory from the initial image to the inverted image. The trajectory is more accurate than the trajectory of initial inversion and thus allows for more stable image generation, reconstruction, editing, etc.

From stage 445 where the bias correction is calculated, the method 400 may proceed to stage 450 where the bias correction is returned. For example, an image generation or editing application may receive the bias correction value to create a generative image using a noise vector which has been improved by being augmented using the bias correction. In various embodiments, the bias correction includes a noise bias correction and a textual bias correction. From stage 450 where the bias correction is returned the method 400 may conclude at ending stage 460.

Figure 5:
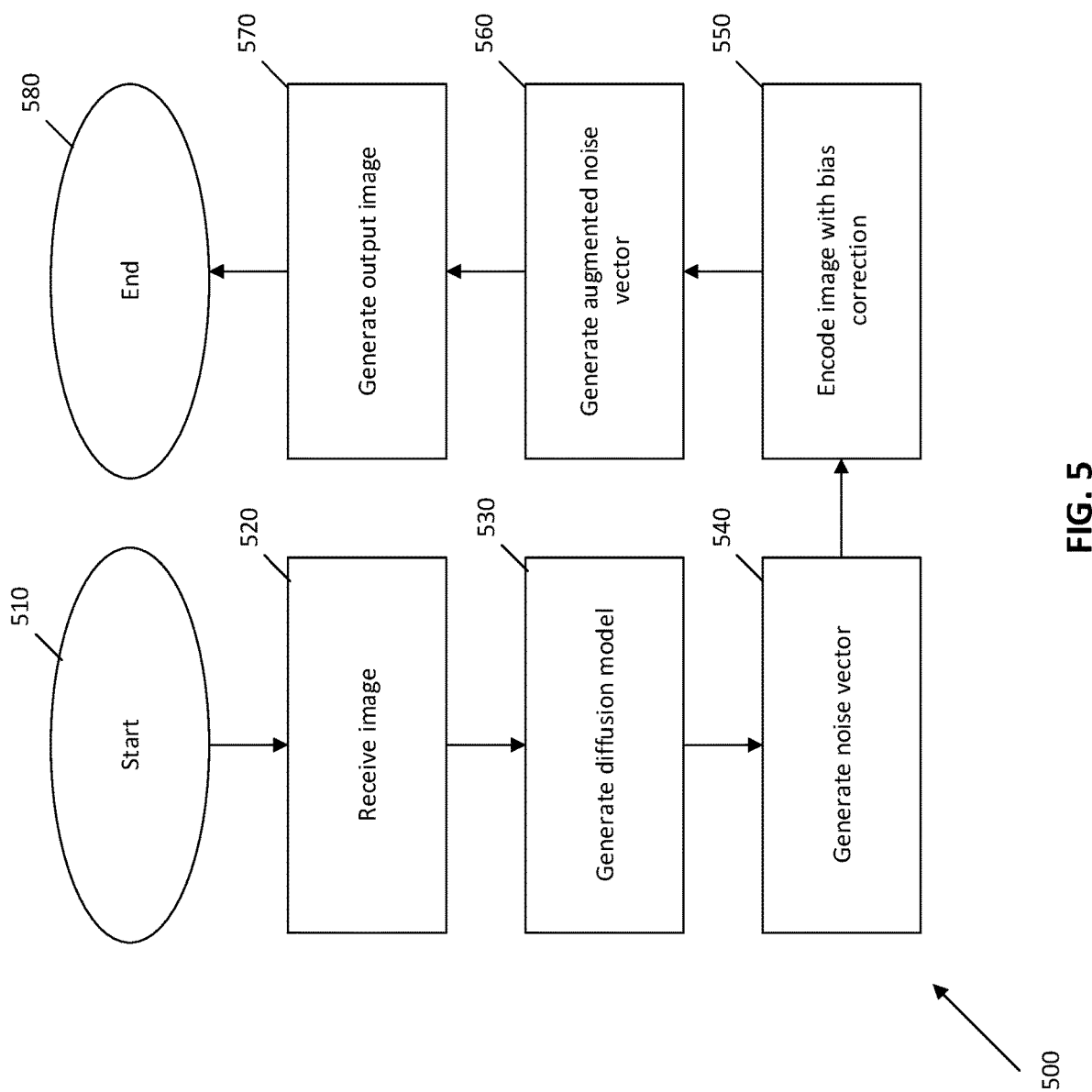
FIG. 5 is a flow chart demonstrating an example method of augmented diffusion inversion using latent trajectory optimization, according to embodiments.

FIG. 5 is a flow chart demonstrating an example method 500 of augmented diffusion inversion using latent trajectory optimization, according to embodiments. As shown, the method 500 begins at starting block 510 and proceeds to stage 520 where a computing device receives an image. For example, a user may upload an image to be edited from a user device to a server device performing the method. The image may be edited, cleaned, or recreated according to various embodiments of the method.

From stage 520 where the computing device receives the image, the method 500 may proceed to stage 530 where the computing device generates a diffusion model for the image. For example, a DDIM can be used to generate a reversible mapping between an image and a latent representation of the image. However, it is anticipated that other models, or other large scale diffusion models could also be used in various applications of this disclosure.

From stage 530 where the computing device generates a diffusion model of the image, the method 500 may proceed to stage 540 where the computing device generates a noise vector for the diffusion model, for example by deterministically applying noise to the image. The noise may be applied deterministically using an Euler method to solve the ODE representation of the DDIM.

From stage 540 where the computing device generates the noise vector for the diffusion model, the method 500 may proceed to stage 550 where the computing device encodes the image with a bias correction variable, for example, by replacing an empty textual embedding of the diffusion model with a conditional textual embedding. In some cases, the empty textual embedding corresponds to a textual prompt input received by the computing system. An output image in some cases is conditioned by the textual prompt according to a guidance factor to perform image manipulations.

From stage 550 where the computing device encodes the image with a bias correction variable, the method 500 may proceed to stage 560 where the computing device generates an augmented noise vector, for example, by using the noise vector, the augmented diffusion model, and a latent trajectory optimization process to determine one or more diffusion trajectories for the augmented noise vector to generate the augmented noise vector. Further, the latent-TOP process can be iterated a number of times for each diffusion trajectory to optimize an augmented trajectory at each step when generating the augmented noise vector.

From stage 560 where the computing device generates an augmented noise vector, the method 500 may proceed to stage 570 where the computing device generates an output image, for example, by automatically generating an output image based on the augmented noise vector. For example, an output image may generated and displayed on a graphical user interface of the computing device. The output image may be generated using a DDIM process that has been augmented using a latent-TOP process to generate an augmented noise vector used by the model to generate images. From stage 570 where the computing device generates an output image, the method 500 may conclude at ending stage 580.

Augmented DDIM Inversion Using Latent Trajectory Optimization Examples

Example 1

In Example 1, a source image is translated to a latent space. The latent space is translated to an inverted image space. The inverted image space is translated to a second latent space. The second latent space is translated to a reconstructed image space. To test consistency, colors are signed based on point identities. For example, if a point in the source domain is blue, then its corresponding point in the target domain should also be colored blue.

In Example 1, images are selected from various synthetic 2D datasets (normalized to calibrate the mean to zero and to identify covariance). Example synthetic image patterns include Two Moons; Checkerboards; Concentric Rings; Concentric Squares; Parallel Rings; and Parallel Lines, etc.

In the example, points in one data set may be mapped to a target domain of a different dataset. Such as red points in a concentric ring dataset being mapped to similar coordinates (by closest relative location) in a target domain of the concentric squares dataset. The latent space provides a disentangled representation of this domain translation.

For various image translations the latent space is not a Gaussian distribution due to holes in the distribution, such as in the center. The translation accuracy is affected by the non-Gaussian latent space causing inconsistency between points in a target and source domain. Even with example synthetic 2D translation tasks latent space noise that is out of Gaussian distribution decreases the accuracy of results generated via DDIM inversion.

By performing the inversion and generative processes using an augmented DDIM model and an augmented noise vector generated via latent-TOP, a consistent result can be achieved even in the case of using a source image with a non-Gaussian distribution.

Example 2

In Example 2, a Stable Diffusion Model is trained on LAION-5B datasets as training data. A subset of two-hundred images and captions pairs is used, although greater or fewer image and caption pairs could be used. The image and caption pairs of can be selected from datasets such as the MS-COCO dataset and TEdBench dataset.

For Example 2, T=50 steps are used for the DDIM inversion and m=10 iterations are used for the optimization of each of the timestamps of the steps. The guidance scale for the initial latent-TOP process is G=7.5. Twenty samples are generated via multiple start initialization for text and noise bias correction. A prior trajectory from a first, traditional DDIM inversion is obtained, and the stepwise sequence from the traditional DDIM inversion process is saved. Then, a separate optimization occurs that is performed on the saved trajectory information.

The process of Example 2 can execute in 1-2 minutes on a NVIDIA V100 GPU with 16G GPU memory, and produces robust and stable results as compared to more traditional DDIB and CycleDiffusion methods, which result in instability and/or distortions using the same hyperparameters for fair comparison under similar computing and memory costs.

In Example 2, traditional DDIM, DDIB and CycleDiffusion models are used with the same input data, but fail to reconstruct input images properly due to instability and inherent limitations. These methods provide an approximate reconstruction of input images but result in distortion, loss of detail, etc..

The effect of noise bias and text bias can be separately analyzed to demonstrate their separate effects on inversion accuracy. Best results are generated using both bias corrections together. Noise bias correction can be better suited to determine corrections for specific image details, whereas text bias correction can be better suited to determine global image structures. For example, noise bias correction can repair a background mismatch, or a texture mismatch, while retaining other local details and global image structures to reconstruct images given a conditional guidance. Also for example, text bias correction can adjust global image structures without affecting local details.

Example 3

Example 3 demonstrates robustness of augmented DDIM with latent-TOP from small perturbations in either image pixel level or text caption prompt. In Example 3, an input image is received and Gaussian noise with a variety of levels is gradually added, including σ=5, 10, 20 (pixel value ranging from 0 to 255). The input image is inverted and reconstructed using various methods. Performance given noisy image inputs is measured. Naive DDIM and DDIB techniques perform inversion along an incorrect inversion path causing image information (e.g., image background portions, image details, positioning and configuration of image elements, color cycle) to be entirely lost, even though only a tiny perturbation is applied.

As noise is increased, the larger noise makes the inversion more difficult. However, augmented DDIM methods using latent-TOP still preserve the global semantics and local details of images even after inversion and reconstruction, recovering original image details without distortion.

Example 4

Example 4 demonstrates the sensitivity of a resulting generative image to the input text prompt. In Example 4, an input image is conditioned on a set of text prompts, inverted, and an image is generated using augmented DDIM using latent-TOP. The textual bias correction, which optimizes the empty text prompt to match different conditional textual prompts, enables strong robustness in generating images consistent with the source caption. In Example 3, an "off-the-shelf" caption model is used to choose a reasonable caption. This way offers some initial guidance for semantic attention maps, which may be useful for image editing and generation.

Example 5

In Example 5, zero-shot text-to image editing occurs via the following augmented inversion formulation:

$$x_T \sim DDIMEncoder(x_T \mid x_0, \mathcal{F}_t), \hat{x}_0 = \mathcal{F}_{\tilde{t}}(x_T) \qquad (10)$$

where $\mathcal{F}_{\tilde{t}}$ is a diffusion model conditioned on text t and target text $\tilde{t}$ describes the target image $\hat{x}_0$ to be generated via DDIM inversion and diffusion. Using this formulation enables both global and local edits to occur by changing the target text input.

Example 6

In Example 6, cross attention control (CAC), of image editing is incorporated. CAC facilitates high-quality image editing by provided a solution to cross-attention mapping errors to improve structural preservation. CAC can be enabled by leveraging the inversion accuracy of augmented DDIM methods using latent-TOP. Prompt-to-Prompt text-to-image editing performs image generation by manipulating cross-attention layers, providing more control over synthesized images. In various embodiments, DDIM inversion offers attention maps which can be meaningful in Prompt-to-Prompt or other text-to-image editing contexts.

Additional Considerations

Thus, the systems and methods disclosed herein significantly improve optimization efficiency, convergence, and stability of image generation. By evaluating various input real images, source captions, and target prompt, systems and methods disclosed herein achieve a high degree of inversion accuracy and robustness to perturbation on text and noise, enabling various real image editing and creation contexts.

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method of automated image processing, comprising:
receiving an image;
defining a diffusion model of the image;
generating a noise vector for the diffusion model by deterministically applying noise to the image;
encoding the image with a bias correction variable by replacing an empty textual embedding of the diffusion model with a conditional textual embedding to generate an augmented diffusion model;
generating an augmented noise vector using the noise vector, the augmented diffusion model, and a latent trajectory optimization process to determine one or more diffusion trajectories for the augmented noise vector; and
automatically generating an output image based on the augmented noise vector.

2. The method of claim 1, wherein generating the augmented noise vector using the augmented diffusion model and the latent trajectory optimization process comprises:
determining a plurality of diffusion trajectories at a plurality of steps between the image and the noise vector by minimizing a difference between the plurality of diffusion trajectories at the plurality of steps and one or more initial trajectories between the image and the noise vector.

3. The method of claim 2, further comprising:
using a first guidance to determine the one or more initial trajectories between the image and the noise vector;
using a second guidance greater than the first guidance to determine the plurality of diffusion trajectories at the plurality of steps;
determining whether the augmented noise vector is Gaussian; and
in response to determining the augmented noise vector is not Gaussian, lowering the first guidance or the second guidance.

4. The method of claim 1, further comprising receiving a conditional text prompt, wherein encoding the image with the bias correction variable by replacing the empty textual embedding of the diffusion model with the conditional textual embedding comprises encoding the image with a textual bias correction corresponding to the conditional text prompt.

5. The method of claim 4, further comprising determining the textual bias correction by performing a fast local search using sampling with multiple hops around a trajectory of the noise vector.

6. The method of claim 4, further comprising using a trajectory of the diffusion model for an initialization point of the augmented diffusion model.

7. The method of claim 1, wherein the latent trajectory optimization process comprises iterating an optimization of the bias correction variable using a multiple start strategy via sampling to obtain one or more bias correction variables.

8. The method of claim 1, further comprising encoding the image with a noise bias correction.

9. The method of claim 1, wherein the diffusion model is a denoising diffusion implicit model.

10. A non-transitory computer readable storage medium comprising instructions, that when executed by one or more processors of a computing system, cause the computing system to:
receive an image;
define a diffusion model of the image;
generate a noise vector for the diffusion model by deterministically applying noise to the image;
encode the image with a bias correction variable by replacing an empty textual embedding of the diffusion model with a conditional textual embedding to generate an augmented diffusion model;
generate an augmented noise vector using the noise vector, the augmented diffusion model, and a latent trajectory optimization process to determine one or more diffusion trajectories for the augmented noise vector; and
automatically generate an output image based on the augmented noise vector.

11. The non-transitory computer readable storage medium of claim 10, wherein the instructions further cause the computing system to:
determine a plurality of diffusion trajectories at a plurality of steps between the image and the noise vector by minimizing a difference between the plurality of diffusion trajectories at the plurality of steps and one or more initial trajectories between the image and the noise vector.

12. The non-transitory computer readable storage medium of claim 11, wherein the instructions further cause the computing system to:
use a first guidance to determine the one or more initial trajectories between the image and the noise vector;
use a second guidance greater than the first guidance to determine the plurality of diffusion trajectories at the plurality of steps;
determine whether the augmented noise vector is Gaussian; and
in response to determining the augmented noise vector is not Gaussian, lower the first guidance or the second guidance.

13. The non-transitory computer readable storage medium of claim 12, wherein the instructions further cause the computing system to:
receive a conditional text prompt, wherein encoding the image with the bias correction variable by replacing the empty textual embedding of the diffusion model with the conditional textual embedding comprises encoding the image with a textual bias correction corresponding to the conditional text prompt.

14. The non-transitory computer readable storage medium of claim 13, wherein the instructions further cause the computing system to:
determine the textual bias correction by performing a fast local search using sampling with multiple hops around a trajectory of the noise vector.

15. The non-transitory computer readable storage medium of claim 10, wherein the instructions further cause the computing system to:

use a trajectory of the diffusion model for an initialization point of the augmented diffusion model.

16. The non-transitory computer readable storage medium of claim 10, wherein the latent trajectory optimization process comprises iterating an optimization of the bias correction variable using a multiple start strategy via sampling to obtain one or more bias correction variables.

17. The non-transitory computer readable storage medium of claim 10, wherein the instructions further cause the computing system to:
encode the image with a noise bias correction.

18. The non-transitory computer readable storage medium of claim 10, wherein the diffusion model is a denoising diffusion implicit model.

19. A system, comprising:
a memory having executable instructions stored thereon; and
one or more processors configured to execute the executable instructions to cause the system to:
receive an image;
define a diffusion model of the image;
generate a noise vector for the diffusion model by deterministically applying noise to the image;
encode the image with a bias correction variable by replacing an empty textual embedding of the diffusion model with a conditional textual embedding to generate an augmented diffusion model;
generate an augmented noise vector using the noise vector, the augmented diffusion model, and a latent trajectory optimization process to determine one or more diffusion trajectories for the augmented noise vector; and
automatically generate an output image based on the augmented noise vector.

20. The system of claim 19, wherein the one or more processors are configured to execute the executable instructions to cause the system to receive a text prompt and automatically generate the output image based on an embedding of the text prompt and based on the augmented noise vector.

* * * * *